US009726759B2

(12) United States Patent
Kaufmann et al.

(10) Patent No.: US 9,726,759 B2
(45) Date of Patent: Aug. 8, 2017

(54) PROCESS AND SYSTEM TO DETERMINE TEMPORAL CHANGES IN RETRANSMISSION AND PROPAGATION OF SIGNALS USED TO MEASURE DISTANCES, SYNCRONIZE ACTUATORS AND GEOREFERENCE APPLICATIONS

(75) Inventors: Pierre Kaufmann, Sao Paulo-Sp (BR); Pedro Levit Kaufmann, Sao Paulo-Sp (BR)

(73) Assignee: Instituto Presbiteriano Mackenzie, Sao Paulo-Sp (BR)

( * ) Notice: Subject to any disclaimer, the term of this patent is extended or adjusted under 35 U.S.C. 154(b) by 938 days.

(21) Appl. No.: 14/110,863

(22) PCT Filed: Apr. 17, 2012

(86) PCT No.: PCT/BR2012/000113
§ 371 (c)(1),
(2), (4) Date: Oct. 9, 2013

(87) PCT Pub. No.: WO2012/142688
PCT Pub. Date: Oct. 26, 2012

(65) Prior Publication Data
US 2014/0225779 A1    Aug. 14, 2014

(30) Foreign Application Priority Data

Apr. 18, 2011  (BR) ...................................... 1102017
Mar. 19, 2012  (BR) ............................ 102012006120

(51) Int. Cl.
*G01S 19/31*    (2010.01)
*G01S 13/87*    (2006.01)
(Continued)

(52) U.S. Cl.
CPC .......... *G01S 13/878* (2013.01); *G01S 5/0263* (2013.01); *G01S 19/31* (2013.01); *G01S 1/04* (2013.01);
(Continued)

(58) Field of Classification Search
CPC .......... G01S 1/04; G01S 13/878; G01S 19/31; G01S 5/00; G01S 5/0263; G01S 5/021; G01S 5/04; G01S 5/06
(Continued)

(56) References Cited

U.S. PATENT DOCUMENTS 5,883,598 A *  3/1999  Parl .......................... G01S 5/06
                                                        342/457
7,403,783 B2 *  7/2008  Cheok ................... G01S 5/0284
                                                        455/456.1

(Continued)

FOREIGN PATENT DOCUMENTS

WO         2004023678 A2     3/2004

OTHER PUBLICATIONS

International Search Report and Written Opinion, Application No. PCT/BR2012/000113 dated Jul. 23, 2012.

*Primary Examiner* — Chuong P Nguyen
(74) *Attorney, Agent, or Firm* — Dinsmore & Shohl LLP (57) ABSTRACT

The proposed solution includes the use of four reference bases on the ground at known positions, with a coded time signal transmitted by one of them which is retransmitted by the repeater station and received by each of the reference bases. Using two distinct sets of three reference bases it is possible to calculate the differences between two positions for the repeater station, assigning to the later changes in time, phase or frequency as well as temporal changes due to the signal propagation in the medium, for the respective elevation angles found for the repeater. It can be then (Continued)

identified which values attributed to the temporal changes produces a minimum difference between the two respective positions of the repeater station. The identified temporal change can be used for the correct determination of the repeater station and its use on pertinent applications.

15 Claims, 4 Drawing Sheets

(51) Int. Cl.
  *G01S 5/02* (2010.01)
  *G01S 5/06* (2006.01)
  *G01S 5/04* (2006.01)
  *G01S 1/04* (2006.01)

(52) U.S. Cl.
  CPC ............... *G01S 5/021* (2013.01); *G01S 5/04* (2013.01); *G01S 5/06* (2013.01)

(58) Field of Classification Search
  USPC .................................... 342/458, 463, 357.71
  See application file for complete search history.

(56) References Cited

U.S. PATENT DOCUMENTS

| | | | |
|---|---|---|---|
| 7,659,850 B1* | 2/2010 | Hou | G01S 5/021 |
| | | | 342/451 |
| 7,822,427 B1 | 10/2010 | Hou | |
| 9,046,602 B2* | 6/2015 | Gardner | G01S 5/021 |
| 9,213,093 B2* | 12/2015 | Do | G01S 5/021 |
| 9,282,459 B2* | 3/2016 | Graube | H04W 4/021 |
| 2004/0219930 A1 | 11/2004 | Lin | |
| 2007/0217379 A1* | 9/2007 | Fujiwara | G01S 5/0205 |
| | | | 370/338 |
| 2010/0178934 A1* | 7/2010 | Moeglein | G01S 19/12 |
| | | | 455/456.1 |
| 2010/0331009 A1* | 12/2010 | Krishnamurthy | G01S 5/0036 |
| | | | 455/456.1 |
| 2011/0171970 A1* | 7/2011 | Ishikawa | G01S 5/14 |
| | | | 455/456.1 |
| 2015/0065160 A1* | 3/2015 | Meredith | H04W 64/00 |
| | | | 455/456.1 |
| 2016/0077185 A1* | 3/2016 | Marshall | G01S 5/021 |
| | | | 455/456.6 |

* cited by examiner

PROCESS AND SYSTEM TO DETERMINE TEMPORAL CHANGES IN RETRANSMISSION AND PROPAGATION OF SIGNALS USED TO MEASURE DISTANCES, SYNCRONIZE ACTUATORS AND GEOREFERENCE APPLICATIONS

FIELD OF INVENTION

The present invention addresses to a process and a system to determine changes in time, phase and frequency at a signal repeater station located at a remote and inaccessible site, being operatively associated to a set of ground-based transmitting and receiving bases, at known geodetic positions, as well as to determine temporal changes due to the signals propagation in the medium, to obtain distance measurements, navigation and geographic positioning, relative to the inaccessible repeater, and to obtain time synchronization through measurements corrected for the changes in frequency (phase delays) and in time at the remote signal repeater. This proposal provides an innovative solution for the remote determination of time changes and of signal transit times in the process of being received and retransmitted by repeater stations or transponders operating at inaccessible conditions and of the additional time changes caused by the signal propagation in the medium where the system operates.

ANTECEDENTS OF THE INVENTION

The echo obtained of a signal sent forward and retransmitted is used to measure distances of remote objects. The precision of the determinations depends entirely on the knowledge and the correction of the temporal effects that occur at the repeater, caused by four principal factors: (a) velocity of propagation in the medium, (b) propagation in the cables and instruments during transmission, (c) propagation in the cables and instruments at the final reception, and (d) in the retransmission by the remote object (repeater) which distance is to be determined.

The models describing (a) are, in general, well known for propagation in different media (terrestrial ionosphere and troposphere) as well as in space (J. W. Marini, "Correction of satellite tracking data for an arbitrary tropospheric profile", Radio Sci., 7, 223-231, 1974; J. A. Klobuchar, "Design and characteristics of the GPS ionospheric time delay algorithm for single frequency users", em PLANS '86-Position Location and Navigation Symposium, Las Vegas, Nev., Nov. 4-7, 1986, Record (A87-41351 18-17), New York, Institute of Electrical and Electronics Engineers, 1986, pp. 280-286, 1986; S. M. Hunt et al., "Equatorial atmospheric and ionospheric modeling at Kwajalein missile range", Lincoln Laboratory Journal, vol. 12, pp. 45-64, 2000; S. M. Honma, Y. Tamura e M. J. Reid, "Tropospheric delay calibrations for VERA", Publ. Astron. Soc. Japan, vol. 60, pp. 951-960, 2008; T. S. Radovanovic, "Adjustment of satellite-based ranging observations for precise positioning and deformation monitoring", PhD dissertation, Department of Geomatics Engineering, University of Calgary, Canada, UCCGR Reports Nr. 20166, 2002, and references therein). After the adequate model selection, the effect of propagation on the temporal changes need to be calculated as a function of the distance and of the angle of elevation through which the repeater is seen, which are parameters also not known in advance Factors (b) and (c) are measured directly, experimentally with high precision.

Factor (d), however, is undetermined, since the remote object is inaccessible for direct measurements and it undergoes to changes in its internal signal propagation characteristics, which can change with time, or for each sequence of signals utilized to determine its distance. In addition other temporal alterations due to Doppler effects and those predicted by relativity may become important for repeaters transported by satellites or spacecrafts moving rapidly in relation to a reference frame containing he points from which the distances from the remote object are intended to become determined. Other temporal changes may be considered as caused by relativistic effects when the satellite (the remore object) moves along different gravitational potential in relation to the geoid (Ashby, N., "Relativity and the global positioning system", Physics Today, 55, pp. 41-47, 2002; Larson, K. M. et al., "An assessment of relativistic effects for low Earth orbiters: the GRACE satellites", Metrologia, 44, pp. 484-490, 2007).

On the other hand, when using meteor as reflecting transponders, phase delays can be caused by the signal scattering on the ionized trails (Wislez J.-M., "Forward Scattering of Radio Waves of Meteor Trails", Proceedings of the International Meteor Conference, Brandenburg, Alemanha, pp. 99-117, 1995).

Electromagnetic signals, such as the radio signals, can be sent to great distances by mean of transmission links. These links receive the transmission, detect it, amplify it, or not, and retransmit the radio signals o the directions of interest.

There technologies are well known and of public domain, and for this reason they will not be described here. Distant wireless transmission of information is accomplished by well known technologies using electromagnetic waves (e.m.w.) as carriers. Radio electromagnetic waves are the most widely utilized. Currently the e.m.w. wireless techniques extend to frequency bands corresponding to the infrared, visible, ultraviolet and X-rays.

Links are used for telecommunications on longer distances. The links receive and retransmit the signals, at the same frequency, or at different frequencies. The links can be natural, such as the reflections of radio e.m.w. in terrestrial ionosphere, or by scattering on ionosphere or troposphere inhomogeneities and by reflection on ionized meteor trails in the upper atmosphere, among others.

An innumerable number of artificial links options have been implemented and utilized, namely a variety of repeaters, retransmitters, generically designated as transponders, installed on ground or in space, on board of a platform at an artificial satellite. At retransmission links the e.m.w. undergo phase delays caused by the electronic devices through which the signal propagates. For many applications this effect does not bring serious consequences to the signals that are being transported. They are delayed all together, for fractions of time, independently from the user. This is the case of wireless retransmissions of audio and video.

However, in intercommunication applications, such as in mobile cell phone, digital telecommunications, the signal synchronism of signals are required at the links. Reference time and frequency standards must be common and synchronized at every link of a wireless telecommunication network. The use of atomic frequency and time standards at every link would be a solution. This option, however might not be always practical, being certainly expensive.

The modern solution for such link synchronization is obtained by time standards referred to GPS satellites, or to similar constellations of geopositioning satellites. The are known as GPS clocks, that provide accuracy and stability of the order of hundred of nanoseconds, that means, at a sufficient level to assure the reference for the electronic circuits operated at the links (T. A. Clark and R. H. Hambly, "Improving the performance of low cost GPS timing receivers", 38th Annual Precise Time and Time Interval (PTTI) Meeting, Reston, Va., USA, 7 Dec. 2006).

The calculations needed to determine distances based on echoes of signals transmitted and received are necessarily associated to the accurate knowledge of the phase delays, or of the temporal changes, that occur at the links, as well as the delays caused by the propagation media, in order to obtain the signals propagation time corrections transported from their origin to their destination, going through the retransmission link.

The remote determination of temporal changes at the repeaters and those due to the signal propagation in the media are conditions essentially required to make viable the use of systems and processes for geographic and space positioning using reference transmitters and receivers on the ground and transponders in space, as described analytically in the article by P. L. Kaufmann et al., "Non recursive algorithm for remote geolocation using ranging measurements", Math. Problems in Engineering, v. 2006, pp. 1-9, Article ID79389, D01:10.1155/MPE/2006/79389, 2006.

The determination of temporal changes at the repeater and the changes due to propagation effects is essential to make viable the correct operation of the concepts exposed in the Patent of Invention PI9101270-8, "System and process of geographic positioning and navigation", granted Sep. 30, 1997 and in its Addition Certificate" C19101270-8, filed May 17, 2002; in the Patent of Invention PI03003968-4, "System and process of geographic and space positioning" filed 8 Oct. 2003, corresponding to PCT/BR2004/000190, "Geographic and space positioning system and process", filed 4 Oct. 2004, which resulted, up to this date, in the following granted patents: U.S. Pat. No. 752,877B2, on May 5, 2009; RU2635934C2 on Aug. 27, 2009; and AU 2004277511, on Nov. 26, 2010.

The phase delays caused by links components, converters, cables and electronics, in the transmission and reception of signals at the ground, can be accurately measured in laboratory and adopted for the data retransmitted by the link. However the continuous use and the remote and inaccessible location of a defined link as, for example, in a satellite, jeopardizes the maintenance of the delays previously determined and makes impossible its updating correction. In the case of transponders in satellites, the relativistic temporal effects will depend on their position in space. In the case of repetition by retransmission in meteor trails, the temporal effects will depend on the direction they occur in the sky. On the other hand many transponders carry internal processors which cause signal retardations, which can be distinct for each sequence of retransmitted signals. The difficulties become aggravated when adding imponderable signal phase changing physical effects—such as effect due to temperature variations in the electronic circuits at the repeater.

In satellites it must also be considered Doppler effects and other caused by relativity and by the gravitational potential. The unpredictable phase variation effects must be taken into account to assure the distance determinations by signal reflection (or by retransmission). Time changes caused by signal propagation in the media may become significant and will depend on the adopted models and of the angles of sight of the repeaters, to be determined. The determination of these changes is a necessary condition to make feasible the application of geopositioning, navigation and time dissemination systems and processes using ground references and transponders in space, as mentioned above.

SUMMARY OF THE INVENTION

Taking into account the operational requirements of wireless signal transmission systems using a remote and inaccessible repeater station, and also the need of the usual accurate and instantaneous determination of the geographic positioning of the referred remote station, the present invention has the objective to define and provide a process and a system, relatively simple to be implemented and economically feasible, to provide the correct and instantaneous determination of the temporal changes, phase delays and frequency shifts, in the signals retransmission and propagation, which can contain audio, video and other information, such as coded time signals, related to a remote and inaccessible repeater station, generally moving in space.

According to the solution proposed by the present invention it is possible to determine, in any instant, the correct geographic and spatial positioning and the adjustment of time indication of a repeater station, remote and inaccessible, from the determination of time changes in retransmission and propagation of signals that the remote station, located at great distance and having a transponder (transceiver or repeater), receives from a stationary transmitter of signals, located at a known and accessible site.

According to the invention the process to determine temporal changes and phase delays at a signal repeater station, remote and inaccessible, and time delays due to signal propagation, comprises one first step to install four reference bases on the ground, at known geographic positions and visible from the repeater station. The following step consists in emission, at a reference instant and by a transmitting device provided in one of the above referred reference bases, here designated as the central base, of a coded time signal, containing the identification of there reference base that is emitting it and of the instant of emission; and the step to receive, by a receiving device installed at each one of the four bases of reference, the coded signal, which was received and retransmitted by the repeating station.

After completed the steps above mentioned, the process continues with the calculation of the difference of at least two positions for the repeater station for the same transmitted coded signal, which calculation is done utilizing at least two distinct sets of three reference bases, being known that the above mentioned difference dependent from a value of the alteration in time, phase or frequency, attributed to the repeater station. Different values for the temporal changes are then attributed systematically and arbitrarily, and calculated, for each of these values adopted, different values for the differences between the two positions. Once the above referred differences between every two respective positions for the repeater station, it is possible to identify which value, attributed to the temporal changes at the repeater, produce a minimum difference for the two positions calculated for the repeater station. The calculations involved in this phase of the process are performed in iterative form, for example, by successive approximations, adopting various values for the temporal changes that might have happen in the signal passage by the repeater station, until a value is identified for which the difference between two calculated positions for the repeater becomes minimum. This value defined the variation in time, frequency or phase, at the repeater station, deduced from the minimum found for the difference in positions for the repeater. The distances of the four bases to the repeater can now be corrected, adopting the temporal change that has been determined. The value of the temporal change can now be used to determine the correct position of the repeater. The same iterative process can include other temporal changes due to the velocities of propagation of the signals characteristics of the medium, adopted according to known propagation models and using the elevation angles the repeater is seen from the bases, found using the same iterative procedure.

In one possible application of the process, another step is further provided to determine the coordinates of the repeater station with correction of the change in time, frequency or phase for the referred instant.

In another process application, the time signals are disseminated to other points on the ground, with known geographic positions, in order to synchronize their respective clocks.

BRIEF DESCRIPTION OF THE FIGURES

The present invention will be described with reference to the attached figures, provided with the scope to illustrate, namely.

The four bases have their own means of communication to the central processing station, to where they send the time differences between the time signal retransmitted by the repeater and their respective clocks. For simplicity, the central processing station could be the same reference base where the time signals are transmitted.

DESCRIPTION OF THE INVENTION

As mentioned before, and illustrated in the attached FIG. 1, the invention provide a process and a system for wireless transmission of signals, as for example digital audio or video signals, or even analog signals, with the use of a repeater station R, remote and inaccessible, which may be represented by a satellite platform or of another object or repeater device of any kind, capable to receive and retransmit, in predetermined directions, the coded time signals.

The invention here presented utilizes four reference bases A, B, C, and D, every three of them not collinear, installed on the ground (see FIG. 1) at known geographic positions with each one of the bases containing signal receiving devices, such as radio frequency signals, modulated digitally, for example, in audio or video, and received and retransmitted by the repeater station R in space. Time coded signals are transmitted by one of the reference bases A, B, C and D and retransmitted by the repeater station R in space back to the reference bases A, B, C, and D.

Figure 1:
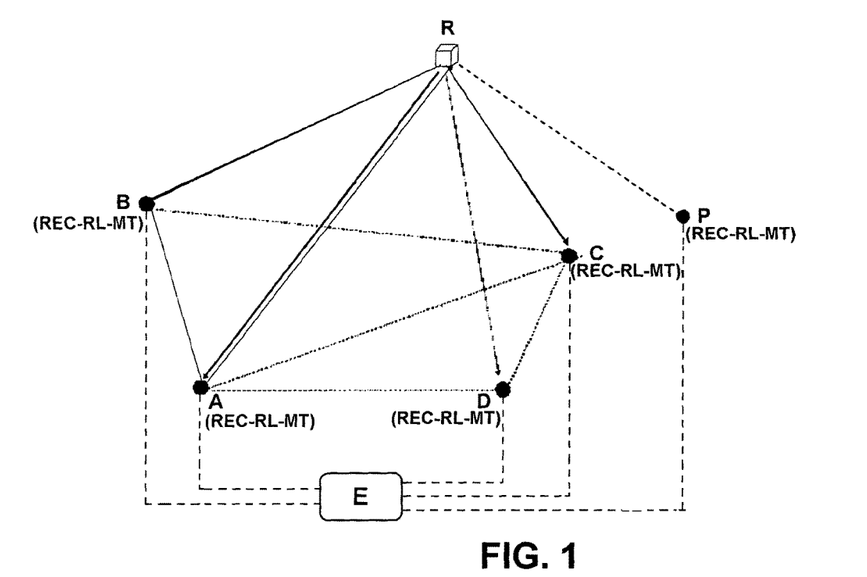
FIG. 1 is a schematic perspective view, illustrating the space positioning off a signal repeater, remote and inaccessible in relation to four bases installed on the ground at known geographic positions, with at least one of them containing a coded signals transmitter to be received and retransmitted by the repeater station in space, with the four bases containing receivers of the signals retransmitted by the repeater station, and where the position labeled by P indicates a target which coordinates are known or are to be determined, depending on the application that will be described ahead.

According to the proposed system one of the four reference bases A, B, C, D contains one coded time signal transmitter T and one receiver REC of the signals retransmitted by the transponder provided at the remote repeater station R. To simplify the description the transmitter is associated to base A. The four reference bases A, B, C, D have receivers to receive the time coded signals retransmitted by the remote transponder at the repeater station R. With exception of base A which contains the transmitting mean T, the other bases have means to transmit the respective differences between the coded time signal received from the remote transponder and time coded signal generated in each one of them, to a central processing base E. To simplify, the reference base A (herewith called central base) can be the same base that transmits the time signals. At the central base the coded time signal received from the remote transponder is compared to the coded time signal generated at the same reference base. The four reference bases have their own precision clocks RL each one synchronized to each other.

The four reference bases A, B, C, D have their own precision clocks RL and means to compare the time signal retransmitted by the remote transponder to the time generated locally. The reference bases process their local differences in time, and transmit them to the central base E which, for simplicity can be the same reference base A, which also have emitted the original signal transmission. The local differences in time will be transmitted to the central base by some mean of communication such as, for example, commercial telecommunication, or making use of the same remote repeating station for data communication.

The correct position for the spatial repeater station R will depend on the knowledge of the temporal changes and/or phase delay at the repeater station R and those caused my the signal propagation in the medium, needed to correct the time differences measured in relation to each three over four reference bases A, B, C, and D. The good performance of the system requires the knowledge of phase delays undergone by the signals being transmitted, in all segments and, in particular, in the coded time signal transit by the repeater station (transponder) R and those caused by propagation.

The present invention resolves the current difficulties to determine correctly and by economically feasible means, the temporal change measurements, or the phase delays, for example, undergone by the signal in the retransmission link at a repeater station R, remote and inaccessible, and in their propagation in the media involved, such as the in the terrestrial atmosphere and ionosphere, as it occurs for stations located in space, in satellite platforms.

With the adoption of four reference bases there are several possible forms to determine the temporal variation on the signal received and retransmitted by the repeater station, or by the transponder. It can be used, for example, a more general procedure with great accuracy to determine the time changes at the repeater station R, which to not depend on the disposition of the planes containing the four reference bases A, B, C and D.

It is possible to adopt the same spherical and euclidean coordinate systems utilized by P. L. Kaufmann et al. (2006), illustrated in FIG. 2, which algorithm permits to equate the repeater R coordinates obtained with the reference bases A, B, C and D.

The measurements obtained by the system provide the following data, according to the nomenclature defined below:

$$AR(\delta_B) = (\Delta t_A - \delta_{At} - \delta_{Ar} - \delta_R)(c/2) - 2\Delta_{pdAR}$$

$$BR(\delta_R) = (\Delta t_B - \delta_{At} - \delta_{Br} - \delta_R)c - AR(\delta_R) - \Delta_{pdBR} - \Delta_{pdAR}$$

$$CR(\delta_R) = (\Delta t_C - \delta_{At} - \delta_{Cr} - \delta_R)c - AR(\delta_R) - \Delta_{pdCR} - \Delta_{pdAR}$$

$$DR(\delta_R) = (\Delta t_D - \delta_{At} - \delta_{Dr} - \delta_R)c - AR(\delta_R) - \Delta_{pdDR} - \Delta_{pdAR} \quad (1)$$

Where $AR(\delta_R)$, $BR(\delta_R)$, $CR(\delta_R)$ and $DR(\delta_R)$ are the distances from bases A, B, C and D to the repeater R position, respectively, expressed s a function of the temporal changes of the signals transiting by the repeater, $\delta_B$, to be determined; $\Delta t_A$, $\Delta t_B$, $\Delta t_C$ and $\Delta t_D$ are the time differences effectively measured at bases A, B, C and D, respectively; $\delta_{At}$ is the time change caused by the signal passage by circuits and cables when being transmitted from base A, previously measured and known; $\delta_{Ar}$, $\delta_{Br}$, $\delta_{Cr}$ and $\delta_{Br}$ are the time changes caused by the signal passage by circuits and cables when being received at bases A, B, C and D, respectively, previously measured and known; and c is the speed of the electromagnetic waves transporting the time coded signals, as for example radio waves, in vacuum, and $\Delta_{pdAR}$, $\Delta_{pdBR}$, $\Delta_{pdCR}$ and $\Delta_{pdDR}$ are the distance errors of the segments AR, BR, CR and DR are temporal delays caused by the propagation of signals in the physical media (atmosphere, ionosphere).

Figure 2:
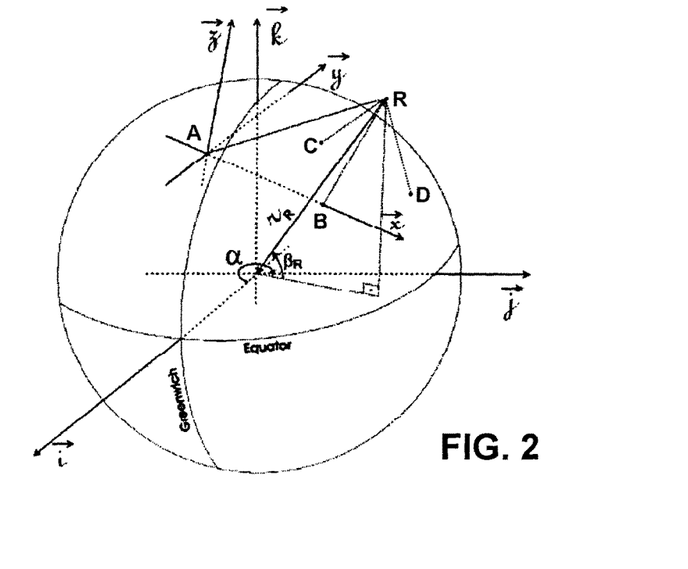
FIG. 2 represent a schematic view in perspective, illustrating the system of coordinates, spherical and Euclidean, used to equate the space positioning of the repeater station, illustrated in FIG. 1.

The errors in distance above described, caused by temporal deviations due to propagation in the medium are added to the distance deviation due to the time change of the signal at the repeater, $\delta_R$, which is the same for the four segments AR, BR, CR and DR. The coordinates for the repeater station R, as determined for bases A, B and C are expressed by the algorithm already developed by P. L. Kaufmann et al. (2006), in the reference system illustrated in FIG. 2, in relation to axis x, y and z, as a function of the signal when transiting by the repeater, $\delta_R$, to be determined:

$$x_R(\delta_R) = \{[AR(\delta_R)]^2 - [BR(\delta_R)]^2 + AB^2\}/2AB$$

$$y_R(\delta_R) = \{\{[r_1(\delta_R)]^2 - [r_2(\delta_R)]^2\}/2y_C\} + y_C/2$$

$$z_R(\delta_R) = \{[r_1(\delta_R)]^2 - [y_R(\delta_R)]^2\}^{1/2} \quad (2)$$

where $$[r_1(\delta_R)]^2 = [AR(\delta_R)]^2 - [x_R(\delta_R)]^2$$

$$[r_2(\delta_R)]^2 = [CR(\delta_R)]^2 - [(x_C - x_R(\delta_R)]^2 \quad (3)$$

IF needed to express the result in spherical coordinates, latitude, longitude and altitude for the repeater, these can be deduced by a simple inverse analytical procedure. On the other hand, with the use of the measurements obtained with the use of base D, we obtain:

$$x_R'(\delta_R) = \{[AR(\delta_R)]^2 - [BR(\delta_R)]^2 + AB^2\}/2AB(\text{igual}_R(\delta_R))$$

$$y_R'(\delta_R) = \{\{[r_1'(\delta_R)]^2 - [r_2'(\delta_R)]^2\}/2y_D\} + y_D/2$$

$$z_R'(\delta_R) = \{[r_1'(\delta_R)]^2 - [y_R'(\delta_R)]^2\}^{1/2}$$

where $$[r_1'(\delta_R)]^2 = [AR(\delta_R)]^2 - [x_R'(\delta_R)]^2 (\text{igual a}/r_1(\delta_R)]^2)$$

$$[r_2'(\delta_R)]^2 = [DR(\delta_R)]^2 - [(x_D - x_R'(\delta_R)]^2 \quad (5)$$

The two systems of equations permit to formulate the discrepance in the repeater's position as a function of the temporal intended to be determined, according to the following expression:

$$f(\delta_R) = |[x_R(\delta_R), y_R(\delta_R), z_R(\delta_R)] - [x_R'(\delta_R), y_R'(\delta_R), z_R'(\delta_R)]|^2 = [x_R(\delta_R) - x_R'(\delta_R)]^2 + [y_R(\delta_R) - y_R'(\delta_R)]^2 + +[z_R(\delta_R) - z_R'(\delta_R)]^2 \quad (6)$$

Utilizing known numerical calculation methods, such as iterative procedures, for example, by successive approximations, adopting various values for the temporal changes that might have happened in the signal passage by the repeater station, in Will be found the value of the phase delay $\delta_R$ at the repeater station R, for which the function $f(\delta_R)$ assumes a minimum value, which will be close to the searched value, needed for the utilization by the system considered in this invention. This procedure can be done with the simultaneous use of data from the other two sets of reference bases A, B, D and A, C, D, adopting base A as the transmitter and improving the accuracy of $\delta_R$ determination.

The iterative described above can include the corrections of the time changes due to the propagation velocities, distinct from c, of the signals that transport the coded time information in the media represented by the low and high terrestrial atmosphere. These velocities are distinct from the speed of light c in vacuum, and its effect correspond to delays in phase of in time causing an apparent larger distance for the measured segments, as described by the equations of system (1). The respective time or phase delays correspond to deviations in the respective segments, which can be calculated at the same time by the iterative process described before, with the determination of the elevation angles from the repeater H, as see from the bases A, B, C and D, and adopting a model to describe the respective segments deviations (as for example described by S. M. Hunt et al., "Equatorial atmospheric and ionospheric modeling at Kwajalein missile range", Lincoln Laboratory Journal, vol. 12, pp. 45-64, 2000; S. M. Honma, Y. Tamura e M. J. Reid, "Tropospheric delay calibrations for VERA", Publ. Astron. Soc. Japan., vol. 60, pp. 951-960, 2008). The process calculations are repeated adopting the deviations for the respective segments, due to propagation effects in the terrestrial atmosphere added to systems of equations (1), obtaining the correction for the time transit at the repeater added to the correction of correction for signal propagation times at all segments, allowing the calculation of the searched coordinates with great accuracy. The process and system proposed by the invention allows the remote determination of the temporal changes at the link defined by the signal repeater station and the temporal changes due to the propagation of signals in the medium, simultaneously to measurements of distance, navigation, clock synchronization and geographic positioning, for every discrete temporal sequence utilized in the procedure. To calculate the corrected distances, geographic coordinates of the repeater and of the targets and applications in time synchronization it will be used the analytical procedures described in the article of P. L. Kaufmann et al., "Non recursive algorithm for remote geolocation using ranging measurements", Math. Problems in Engineering, v. 2006, pp. 1-9, Article ID79389, DOI: 10.1155/MPE/2006/79389, 2006.

The phase delays corresponding to the references bases A, B, C and D can be well determines "in loco" and are assumed as fixed and well known data, considering that such reference bases are fixed and accessible to all procedures for verifying measurements.

The solution proposed by the present invention makes the economically possible, with high degree of accuracy, the determinations of phase delays and temporal changes in the passage of time coded signals by the repeating station R (in reception and retransmission), at a remote and inaccessible location, as well as the time changes caused by propagation effects in the medium.

The temporal effects in the time coded signals in their passage by the repeater station R, and those caused by the signal propagation at different elevation angle, are unknown and cannot be determined with only three bases of reference in the system, which define only one position for the repeater R.

The process here proposed can also include steps to: emit, from the above indicated reference base at successive instants, coded signals and to obtain successive coordinates for the repeater station R, corrected in function of changes in time, phase and frequency, in the retransmission of the above said successive coded signal, in order to allow the navigation of the repeating station R, making the calculations of coordinates for the repeater shown before with system of equations (2), to which it will be introduced the time changes ($\delta_R$) and $\Delta_{pdAR}$, $\Delta_{pdBR}$, $\Delta_{pdCR}$ and $\Delta_{pdDR}$ determined according to the present invention; retransmit, by the repeater station R, the coded time signals to other targets which geographic coordinates are well known (one of them represented in this application by point P in FIG. 1); determine the difference between the time coded signal that arrives at target P and the time generated by its own clock, $\Delta'_P$ allowing the correction of synchronism, following the equation (P. L. Kaufmann et al., 2006):

$$\Delta'_P = (AR/c) + (PR/c) + \delta_{At} + \delta_{Pr} + \delta_R + \Delta_{pdPR} + \Delta_{pdAR} \quad (7)$$

where AR and PR are the measured segments, $\delta_{At}$ and $\delta_{Pr}$ are the temporal changes previously determined and known at the transmitter and at the target P with known position, respectively, $\delta_R$ and $\Delta_{pdPR}$ are the time changes determined by the present invention. The synchronization or time correction will be $\Delta'_P - \Delta_P$ where $\Delta_P$ is the time difference predicted theoretically for position P.

Figure 3:
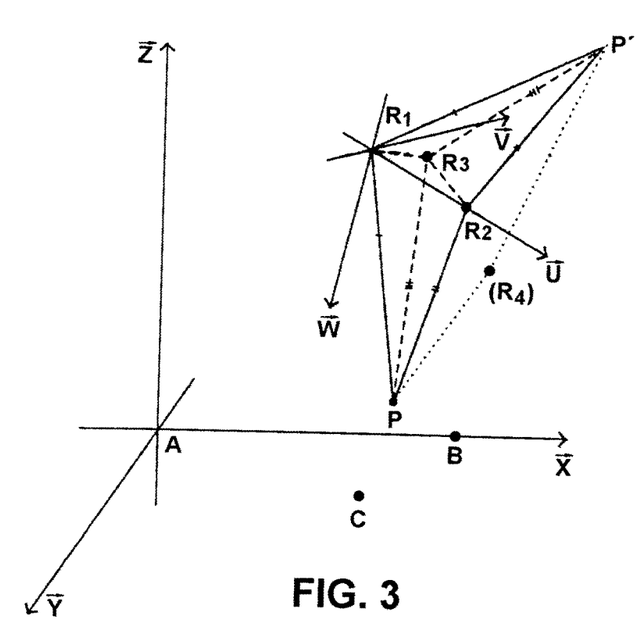
FIG. 3 represent the four distinct positions for the repeater station, in two coordinate systems, one referred to x, y, z and another referred to u, v, w, utilized to find the position of the target P, which coordinates are to be determined.
Figure 4:
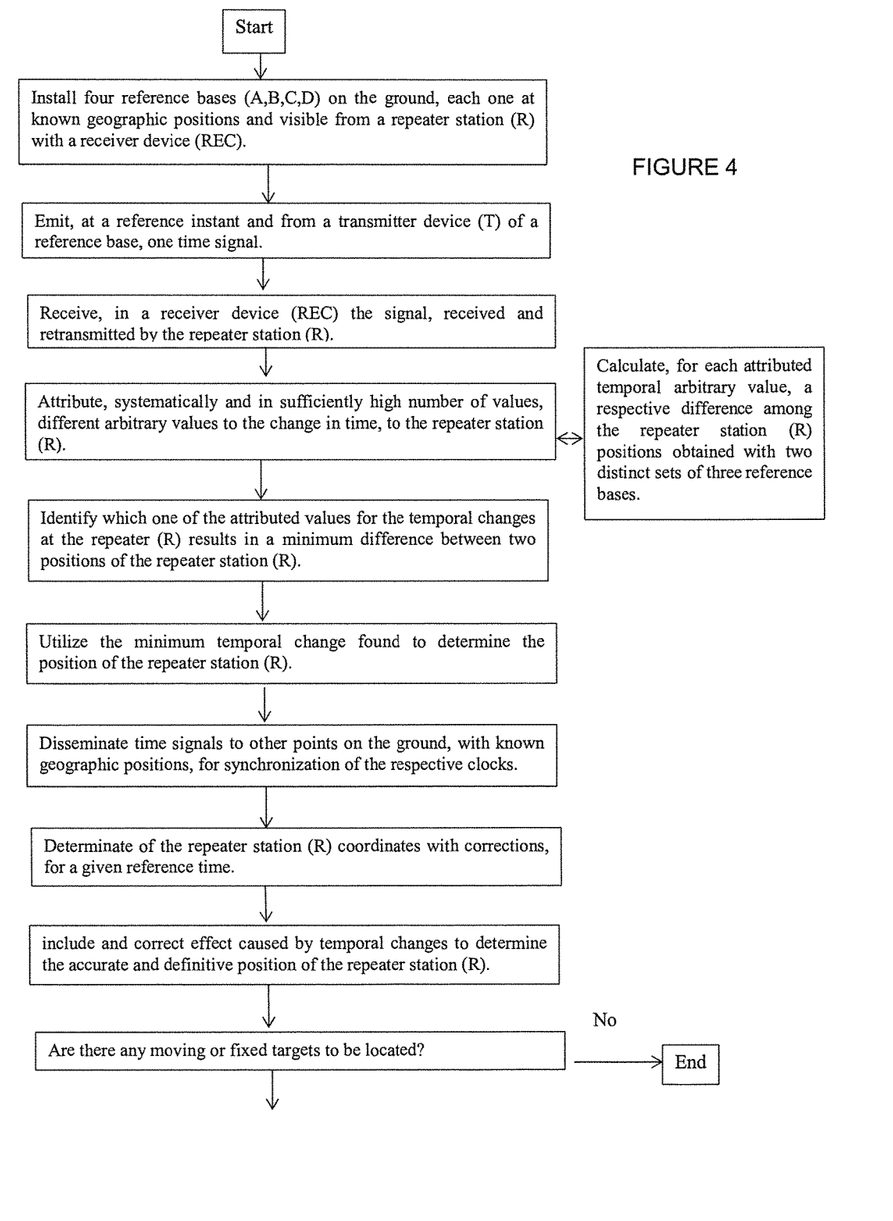
FIG. 4 shows a process flow diagram to determine temporal changes in retransmission and propagation of signals, to measure distances, synchronize actuators and georeferencing defined in the present invention.

The other possible step is to retransmit, by the repeater station R, the time coded signals, to the other targets with unknown position (similarly represented by the point P in FIG. 1), with their clocks synchronized to the clocks installed at the four reference bases, A, B, C, D; to obtain the distances from the repeater station R to the other targets, corrected for temporal changes at retransmission and in propagation; and determine the coordinates for the targets in at least three successive instants, adopting the corrections in time, frequency and phase. It is therefore possible to calculate the distance Of the repeater station R to the reference bases A, B, C, D and to the targets with positions to be determined, with corrections of the time changes at retransmission and in propagation, at repeater positions in four different instants, which positions are not in a straight line in space, defining, univocally, in any coordinate system in space, through four successive measurements, the spatial position of the target, as it has been proposed to determine. The analytical solution to perform these calculations can follow, for example, the algorithm published by P. L. Kaufmann et al. (2006) repeating the procedures expressed by equations (1), (2) and (3) in relation to one set of three reference bases that include base A where the transmitter is located, for four instants above referred, obtaining four spheres with distinct radii, all of them centered on the repeater, at positions and instants distinct, respectively. The interception of spheres will give the position of target P, which coordinates become determinate. The practical procedure is illustrated in FIG. 3 (after P. L. Kaufmann et al., 2006) where a target P, with position to be determined (A, x, y, z) is located in relation to the four distinct positions of the repeater $R_1$, $R_2$, $R_3$ and $R_4$, being the last position na option when the surface of the planet itself cannot be used as a fourth reference. The operations are made by adding another system of reference as a function of the repeater's positions in $R_1$, $R_2$, $R_3$ and $R_4$ (see FIG. 3), u, v, w), where the target's coordinates u, v and w constitute the solution for the system. It has been shown by P. L. Kaufmann et al. (2006) that for three repeater's positions two solutions are found:

$$u_P = (PR_1^2 - PR_2^2 + R_1R_2^2)/2R_1R_2$$

$$v_P = [(\rho_1^2 - \rho_2^2)/2v_{R3}] + v_{R3}/2$$

$$w_P = \pm(\rho_1^2 - v_P^2)^{1/2} \quad (8)$$

where $\rho_1^2 = PR_1^2 - u_P^2 e \rho_2^2 = PR_3^2 - (u_{R3} - u_p)^2$.

The uncertainty in the signal of $w_P$ is eliminated by adopting a fourth sphere to define only one position. This can be the interception with the planet's surface, taken as the fourth reference surface, or by adding one fourth position for the repeater station $R_4$ (see FIG. 3), generating a respective fourth sphere with radius $PR_4$.

The position solution found, using known analytical procedures, can be converted into the (A, x, y, z) system by determining the position of P ($x_P$, $y_P$, $z_P$) in this coordinate system. In the case there are interest in expressing the results in spherical coordinates (latitude, longitude, altitude of the repeater's station), these can be found using well known analytical procedures, deduced from simple known operations.

The technical solution proposed by the present invention permits to choose the time or the hour of reference to perform the measurements, provided there is synchronism between the clocks provided at the reference bases and/or at the targets with positions are to be determined.

The technical solution proposed allows: the determination of geographic and spatial positions of targets located at distances which are within the visibility line as seen from the repeater R in space; the prediction for the adoption of a larger number of fixed reference bases A, B, C, D, covering larger geographic extensions with the use of the same repeater R in space; the prediction the adoption of more than one repeater station R in space, extending the area on the terrestrial surface to become surveyed, to define targets geopositioning; to calculate the targets geographic position with four transponders in space, separated at a distance from each other, with one single time signal interaction; and to allow the accomplishment of hundreds of successive measurements per minute of time, of one or more targets, fixed or mobile, with the use of a single repeater station R in space.

The process and system here presented can be applied to any kind of transponders or repeaters of electromagnetic waves in general in space, being artificial or natural, active or passive.

The invention claimed is:
1. A process to determine temporal changes in retransmission and propagation of signals, to measure distances, synchronize actuators, and georeferencing, comprising the steps of:
   installing four reference bases, each of the four reference bases comprising a receiver device, wherein three of the four reference bases are not collinear, are positioned at known geographic positions, and are visible from a repeater station;

emitting, from a transmitter device at a reference instant, a one time coded signal containing an identification of a corresponding one of the four reference bases and of the reference instant;

receiving, in the receiver device at each one of the four reference bases, the one time coded signal as received and retransmitted by the repeater station;

attributing, systematically, different arbitrary values to a change in time, phase or frequency to the repeater station to obtain one or more attributed temporal changes;

calculating, for each one of the one or more attributed temporal changes, one respective position difference for the repeater station obtained with the use of two distinct sets of the three reference bases that are not collinear;

identifying which one of the attributed temporal changes at the repeater station results in a minimum difference between two positions of the repeater station, wherein the two positions are obtained using the two distinct sets of the three reference bases that are not collinear; and utilizing the temporal changes to determine a position of the repeater station.

2. The process according to claim 1, wherein the position difference for the repeater station is calculated by attributing certain values to the one or more attributed temporal changes in a sufficiently high number of values, and the minimum difference is identified.

3. The process according to claim 2, wherein the position difference for the repeater station accounts for temporal changes due to a signal propagation characteristic of a medium in which the repeater station operates, known propagation models, and elevation angles for the repeater station as seen from each of the four bases.

4. The process according to claim 3, further comprising a step of determining repeater station coordinates with corrections for changes in time, frequency or phase, for a given instant of reference.

5. The process according to claim 3, further comprising a step of disseminating time signals to other points with known geographic positions for synchronization of clocks installed in each of the four reference bases.

6. The process according to claim 3, further comprising:
emitting, from one of the four reference bases and at successive instants, coded signals and successive coordinates for the repeater station, corrected taking into account the time, frequency or phase changes in retransmission and propagation of said coded signals in order to determine a navigation of the repeater station;

retransmitting, by the repeater station, the coded signals to other targets with unknown geographic positions, each one of the other targets having a clock that is synchronized to clocks installed at the four reference bases;

obtaining distances from the repeater station to the other targets, corrected for the time changes on retransmission and on the propagation in the medium; and determining targets' coordinates by measuring time differences in at least three successive instants, with the adoption of changes in time, phase or frequency.

7. The process according to claim 6, further comprising a step of:
calculating a spatial positioning of a particular target based on a distance from the repeater station to each of the four reference bases and to the other targets with the unknown geographic positions and based on corrections for the time changes at the repeater station and the time changes caused by the signal propagation in the medium, wherein the unknown geographic positions are not along a single straight line.

8. A system to determine temporal changes in retransmission and propagation of signals, addressed for measurement of distances, synchronize actuators and georeferencing, from a remote and inaccessible repeater station containing a transponder, the system comprising:

four reference bases, wherein three of the four reference bases are not collinear, are at known geographic positions, and are visible from the repeater station;

one transmitting device configured to emit, at a reference instant, a time coded signal containing an identification of a reference transmitting base and of an instant of emission;

one receiving device installed at each one of the four reference bases, the one receiving device capable to receive the time coded signal, wherein the time coded signal is emitted by the transmitting device and retransmitted by the repeater station;

a plurality of precision clocks, wherein each one of the plurality of precision clocks is installed at every one of the four reference bases;

one central processing station that:
receives the coded time signal that is retransmitted by the repeater station, compares the coded time signal to a coded time signal generated at an emitting reference base, assigns different arbitrary values for changes in time, phase or frequency, calculates, for each of a plurality of assigned temporal changes, a respective difference between positions for the repeater station, wherein the respective difference is obtained from two distinct sets of three reference bases, identifies which value assigned to the temporal change at the repeater station results in a minimum difference between two positions found for the repeater station, and processes a corresponding temporal change to determine a position of the repeater station; and one transmission device provided at each of the three reference bases, each transmission device forwarding to the central processing station a time difference between the coded time signal received from the transponder at the repeater station and the respective coded time signal generated at each one of the three reference bases.

9. The system according to claim 8, wherein the central processing station is defined at an emitting reference base, provided with the transmission device.

10. The system according to claim 8, wherein the central processing station is able to calculate algebraically differences between positions of the repeater station and assign values for the temporal change in a sufficient number of assignments to allow an identification of the minimum differences.

11. The system according to claim 10, wherein a repetition of iterative calculations of differences between positions of the repeater station, when processed by the central processing station, include signal propagation characteristics to a medium where the characteristics propagate, and wherein the characteristics are obtained from known models and elevation angles of the repeater station as seen from the reference bases.

12. The system according to claim 11, wherein the central processing station determines coordinates of the repeater station with correction of changes in time, frequency or phase, for a given instant of reference.

13. The system according to claim 11, further comprising other points having known geographic positions for which the time coded signals are disseminated, for synchronization of the plurality of precision clocks.

14. The system according to claim 11, further comprising other targets with unknown geographic positions and having corresponding clocks synchronized to the plurality of precision clocks.

15. The system according to claim 14, wherein the central processing station calculates a spatial positioning of a particular target based on a distance of the repeater station to the reference bases and to the other targets with unknown geographic positions, wherein calculating includes corrections for temporal changes at the repeater station and temporal changes caused by propagation in the medium, and wherein the unknown geographic positions are not in a same straight line.

* * * * *